(12) United States Patent
Elgamal (10) Patent No.: US 10,735,896 B2
(45) Date of Patent: Aug. 4, 2020

(54) ASYNCHRONOUS MUTUAL INTEREST NETWORKING ALGORITHM

(71) Applicant: Mohamed Elgamal, Dyer, IN (US)

(72) Inventor: Mohamed Elgamal, Dyer, IN (US)

( * ) Notice: Subject to any disclaimer, the term of this patent is extended or adjusted under 35 U.S.C. 154(b) by 0 days.

(21) Appl. No.: 16/054,390

(22) Filed: Aug. 3, 2018

(65) Prior Publication Data
US 2019/0053004 A1 Feb. 14, 2019

Related U.S. Application Data

(60) Provisional application No. 62/544,314, filed on Aug. 11, 2017.

(51) Int. Cl.
| | |
|---|---|
| *H04W 4/02* | (2018.01) |
| *H04W 4/08* | (2009.01) |
| *G06Q 30/08* | (2012.01) |
| *G06Q 50/00* | (2012.01) |
| *H04W 12/02* | (2009.01) |
| *H04L 12/58* | (2006.01) |
| *H04W 8/18* | (2009.01) |

(52) U.S. Cl.
CPC ............ *H04W 4/023* (2013.01); *G06Q 30/08* (2013.01); *G06Q 50/01* (2013.01); *H04L 51/32* (2013.01); *H04W 4/08* (2013.01); *H04W 12/02* (2013.01); *H04W 8/18* (2013.01)

(58) Field of Classification Search
CPC ....... H04W 4/023; H04W 4/08; H04W 12/02; H04W 8/18; G06Q 30/08; G06Q 50/01
See application file for complete search history.

(56) References Cited

U.S. PATENT DOCUMENTS

| | | | | |
|---|---|---|---|---|
| 9,148,333 | B2* | 9/2015 | Bustamente | ...... H04L 29/12594 |
| 2009/0259485 | A1* | 10/2009 | Perlman | .................. G06Q 10/10 |
| | | | | 705/319 |
| 2010/0293029 | A1* | 11/2010 | Olliphant | ......... G06Q 10/06314 |
| | | | | 705/7.19 |
| 2011/0225631 | A1* | 9/2011 | Pearson | .............. G06F 21/6218 |
| | | | | 726/4 |
| 2011/0244800 | A1* | 10/2011 | Bogestam | .............. G06Q 30/02 |
| | | | | 455/41.2 |
| 2012/0078667 | A1* | 3/2012 | Denker | .................. G06Q 10/02 |
| | | | | 705/5 |
| 2014/0164476 | A1* | 6/2014 | Thomson | .............. G06Q 10/101 |
| | | | | 709/203 |
| 2015/0058059 | A1* | 2/2015 | Kahan | ................ G06Q 10/1095 |
| | | | | 705/7.19 |

* cited by examiner

*Primary Examiner* — Muthuswamy G Manoharan

(74) *Attorney, Agent, or Firm* — Richards Patent Law P.C.

(57) ABSTRACT

The present disclosure provides a bilateral social media notification system. In one example, the social network system features the ability for users to have unique identification variables that are searchable. This social networking system also has a series of specific activity tags which may be associated with the unique identifications. Only unique identifications with the same activity tags will be matched and disclosed by the system to ensure no embarrassing rejections occur.

18 Claims, 8 Drawing Sheets

Group matcher request for multiple Tags

```
Asking user to specify a group of target users
And Tags
```

OR

```
Asking user to specify criteria for targets (such as age,
location, workplace or school)

The system identifies the users and keeps the list hidden
from asking user to protect their privacy
```

```
For each Tag in the activity list, a group matcher
request is generated as per previous algorithm
and results are handled in the same way
```

FIG. 5

For-All request ⤴ 10

| Asking user to specify TAG he is willing to share with everyone who expresses the same interest |

| This request is not made public, instead is kept hidden and used as a counter request if another user targets the asking user with a similar request |

| Thus the request is revealed only to those who expressed similar interest |

ASYNCHRONOUS MUTUAL INTEREST NETWORKING ALGORITHM

CROSS-REFERENCE TO RELATED APPLICATIONS

This application incorporates by reference and claims the benefit of priority to U.S. Provisional Application 62/544,314 filed on Aug. 11, 2017.

BACKGROUND OF THE INVENTION

The present subject matter relates generally to a social media system. More specifically, the present invention relates to an asynchronous mutual interest networking algorithm (AMINA) and bilateral social media notification system.

Social networks have united the world in ways which a few decades ago seemed impossible. Almost every adult American has some sort of social media presence (81% according to one source). With this rise in interconnectedness, many people are able to keep track of loved ones and friends which they were unable to do previously. However, new and complex social interactions have arisen from the accessibility and visibility social media enables.

As social networks and the internet are always active and more or less permanent, it is fairly easy for a user to embarrass themselves or say or do something regrettable. For example, some social media services such as Facebook enable users to indicate their relationship status. When such a status is input into Facebook or updated, one user of the service must propose the change in relationship status and the other user must accept before this information is posted on Facebook. While the requirement that both sides agree to show they are "in a relationship" helps save some embarrassment, if one user was to propose a relationship and the other to turn down the proposal, the repercussions could be awkward to say the least.

This issue exists because present social media services require unilateral "risk" when a user wishes to make contact with another user. Whether this risk is in the form of social risk (e.g., turned down for a date), financial risk (e.g., enforceable offer to buy something at a bad price), or something else at stake, modern social media does little to shield users from risks not everyone is willing to take. Such risks exist in all forms of human interaction, including face-to-face, over the phone, postal letter, or email. However, computerized social media is uniquely positioned to prevent such risks, but presently does nothing to aid users. In fact (continuing with the Facebook as an example) many users hesitate to add someone as a friend on Facebook or carry out other interactions for fear they might be turned down, etc. Such fears dampen and reduce the enjoyment of social media usage.

Accordingly, there is a need for a bilateral social media notification system, as described herein.

BRIEF SUMMARY OF THE INVENTION

To meet the needs described above and others, the present disclosure details a social networking system which enables bilateral notification of users.

In one embodiment of the invention a social network system features the ability for users to have unique identification variables that are searchable. This social networking system also has a series of specific activity tags which may be associated with the unique identifications. Only unique identifications with the same activity tags will be matched by the system to ensure no embarrassing rejections occur.

This social networking system can be accessed from personal computers and/or mobile devices, with the system being hosted by a central server. The centralized server may feature one or more databases of user information. These database(s) (in one example) may feature a matching table where each user is represented along the rows and columns. The users stored on the rows may be the requester(s), while the users on the columns are the targets.

When a request is entered from "user1" to do "activity-A" with "user2". The server goes to the matching table and marks the cell identified by row value "user1" and column value "user2". When "user2" enters his interest to do "activity-A" with "user1", the cell (row user2, column user1) which is a different cell will also be marked. When the system finds that both cells are marked with the same "activity-A" tag, then the system will notify both users that they wish to do "activity-A" together.

It is important to note that, without both users marking each other, there are no notifications generated for anyone, and the request(s) remain hidden. This allows the users to express themselves without fear of rejection, knowing that only requests that were made bilaterally are the ones that generate notification(s).

The system above can function for user-to-user connections or user-to-group connections. For example, in a user-to-user situation, Jim and Laura are coworkers and Jim would like to date Laura. If Jim asks Laura out and she refuses, this can make their work relationship awkward and potentially can make Laura uncomfortable or even feel pressured or harassed. So, Jim logs into the social networking system and marks Laura with an activity tag (e.g., "Please date me"). Laura doesn't receive any invite or requests in response to this proposed social media connection, so his interest remains hidden, allowing their work relationship to continue as usual. If, however, Laura subsequently marks Jim with the same activity tag (e.g. "Please date me"), the system will generate a notification for both Laura and Jim to tell them that they are interested in each other.

Continuing with this example, if Jim and Laura begin dating, they can use the system to manage relationship mile stones. For example, Laura may feel she is ready to get married after 3 months while it takes Jim 6 month to reach that decision. Bringing up the topic of marriage prematurely can alienate Jim and make him feel pressured. Instead Laura can mark Jim with the activity tag (e.g., "I want to get married"). Jim receives no notification of Laura's actions until he places his own request for the same activity tag. At which point both are notified that they are ready to discuss marriage. This eliminates the uncomfortable nature of difficult conversation.

The functionality of the present system does not have to be limited to dating activities and can also be used for to find similar interests between friends without going through the effort of matching interests as well as the awkward situations that result from rejected invites to do various social activities.

Turning from user-to-user requests, the present system can also enable user-to-group requests. A user can target a group of users based on their location, age or other attributes, or a combination of attributes. For example, a user (Jim, an older adult) who has an interest in an activity such as playing a game such as Mancala, can use the activity tag (e.g., "I want to play mancala"), to find other system users of his age group living in his zip code (who are also doing a similar search). This allows the system to reveal this request only to those searching for a user like Jim, without presenting users not interested in mancala with invites, nor allowing Jim to match with users who don't fit his needs such as children. Additionally, this functionally hides Jim's interest in Mancala from users he does not want to share such interest with.

In order to ensure accurate matching, the system's activity tags may be somewhat tightly controlled. The system may provide users with the ability to create activity tags and also provide a searchable list of activity tags to ensure that an activity is not marked with two different activity tags so users will not miss each other.

The present system may be coded in PHP, MySQL, XCode, Swift, Python, MongoDB, and/or HTML/JavaScript. In an example, the system can use a graph database such as Neo4J, among others. However, it can be implemented using any different type(s) of databases and programming languages capable of creating a social media system in whole or in part that enables bilateral connection, notification, etc. requests to be sent amongst system users.

A goal of the present invention is to avoid the hesitation social media users have when deciding to interact with other users or not. Social media enables social interactions but can also carry with it social stigmas which scare users into not expressing themselves fully. Rather it be a request for a romantic date, job proposal, or offer for the sale of goods; social media can enable awkward rejections that may even result in legal liability. The present system prevents such awkwardness by enabling users to form bilateral connections which require both parties to submit the same action for notification to occur.

A benefit of the present system is that it removes virtually all risk of proposing an activity, connection, etc. on social media. Many people would like to go to the zoo today, go skydiving next week, or tell their neighbor they like them a lot, but all of these actions are awkward to express on social media and require the user(s) that wish to express such feeling, etc. to unilaterally put themselves into the social media ethos with no protection whatsoever. This creates a situation in which social media users are forced to be easy targets for internet trolls, cyber bullies, or simply embarrass themselves unintentionally. The present system avoids all of this by requiring at least two users to express the same emotions, request the same connection, etc. before the system will disclose any information.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
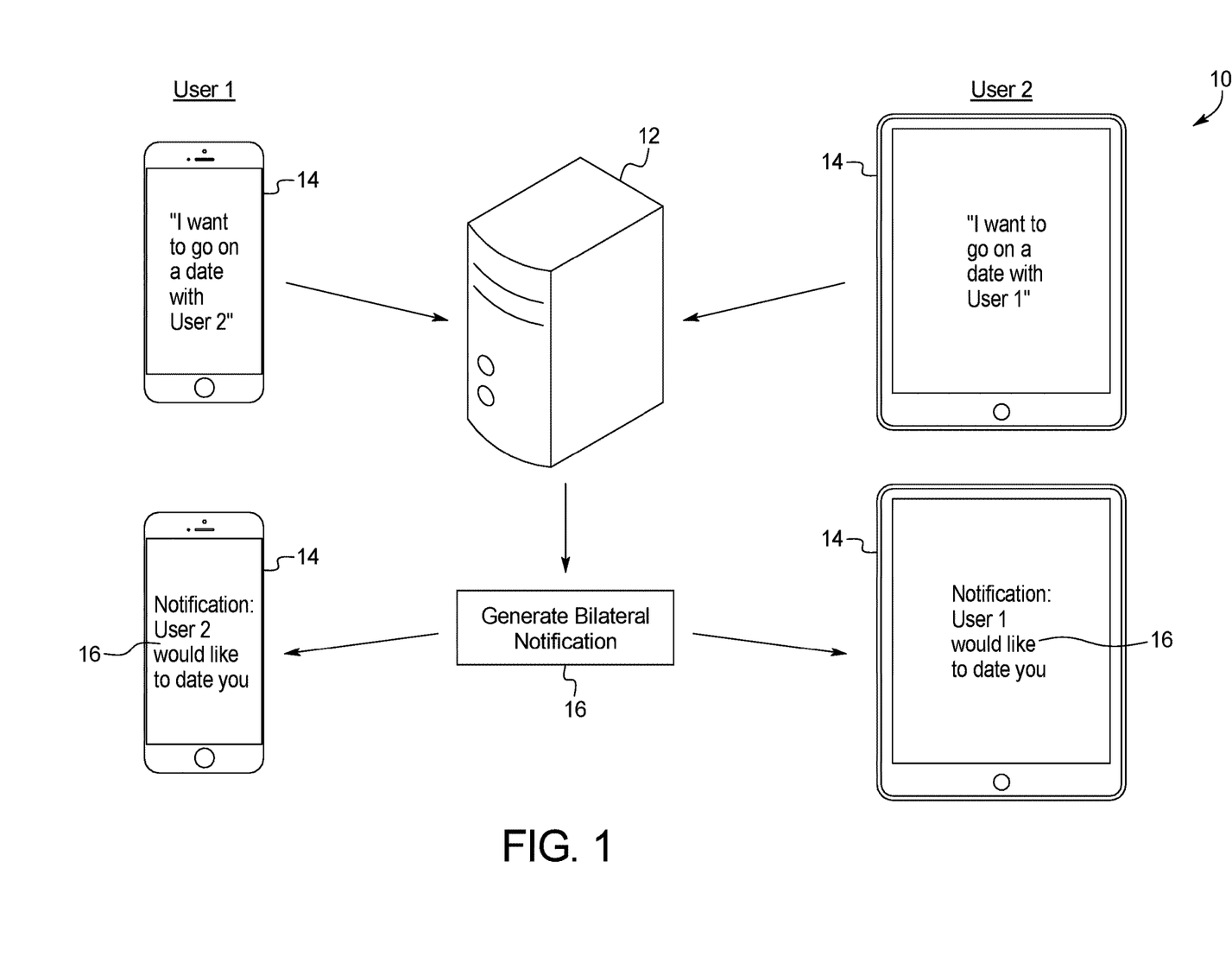
FIG. 1 is an overview diagram of a bilateral social media notification system.

FIG. 1 is an overview diagram of a bilateral social media notification system. As shown in FIG. 1, the system 10 may be comprised of end user devices 14 and a centralized server 12. The end user devices 14 may be smartphones, tablets, personal computers, or any other computerized device capable of running a computer application. These end user devices 14 may communicate with the centralized server 12 via the internet or any other network capable of data transmission. The centralized sever itself 12, in this example, is a single physical server but the present system 10 may be hosted across multiple physical servers and/or utilize a cloud based hosting solution.

The centralized server 12 (in this example) contains one or more databases which store and supply information to a graphical user interface (GUI) of the system. This GUI may be accessed by the end user devices and the data stored on the centralized server may also be supplied to other computerized systems via system integration. The system 10 may also connect to various external data sources (not illustrated in this example) to provide additional information or social media connections to system users.

In the example shown, User 1 and User 2 both wish to date one another. Both users log into the system 10 via its GUI and indicate their wish to date the other user. The centralized server 12 stores each user's wish to date the other within its database(s) as an activity tag (e.g. "User 1 wishes to date User 2") and notifies the users of their mutual interest only when both users have submitted their request.

Figure 2:
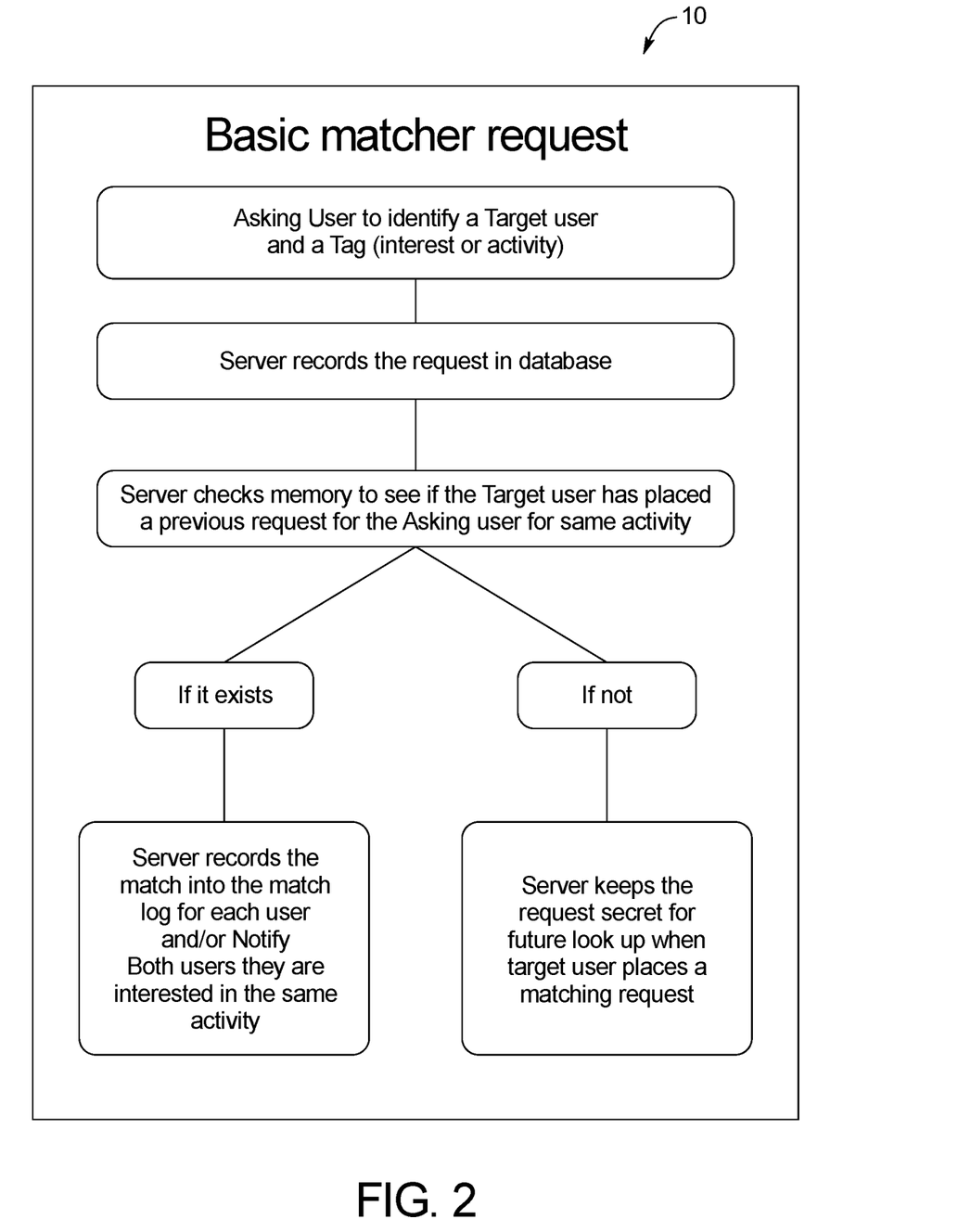
FIG. 2 is a flowchart of a bilateral social media notification system for a user-to-user request.

FIG. 2 is a flowchart of a bilateral social media notification system for a user-to-user request. As shown in FIG. 2, when a user wishes to contact another user on social media, they may employ the present system which enables them to indicate a notification they would like sent or connection they would like to make with another social media user. When the user "User 1" inputs such a request, the server stores 12 the information in a database. The time length for which such a request may be stored can be definite (e.g., expire after 2 weeks if the other user does not input the same request) or indefinite. If the targeted user "User 2" also indicates they would like to form the same connection or send the same notification as "User 1", the system 10 will notify both users and/or carry out the indicated action (e.g., add another user as a friend). If the targeted user "User 2" fails to input a request which matches that of "User 1", no notification is sent and the system 10 will hold the "User 1" request in its database until it expires (or indefinitely).

Examples previously given in this disclosure deal primarily with dating, marriage, and other relationship milestones, but the system 10 is capable of regulating any social media interaction. For instance, on the popular photo sharing site Instagram, users have to request to follow the Instagram account of another user (in most cases). The targeted user (e.g., the followed party) gains an upper hand in this social media interaction as not only do they have the ability to approve or reject a follower's request but the user also does not have to follow the requesting party. This enables a followed user to allow someone to follow their Instagram account without following the requesting user's Instagram account in return. Such actions can be done as a measure of disrespect, as the lack of a return follow indicates to the other user that their social media account is not worth following. The present system 10 can prevent such unpleasantness by enabling a user to only request to follow a given Instagram account if the account owner wishes for them to follow the given account as well. Additionally, the present system 10 can be set-up to only request to follow an account if the targeted account has expressed interest in following the requesting party's account as well. This functionality enables Instagram users to follow each other without potential embarrassment.

Figure 3:
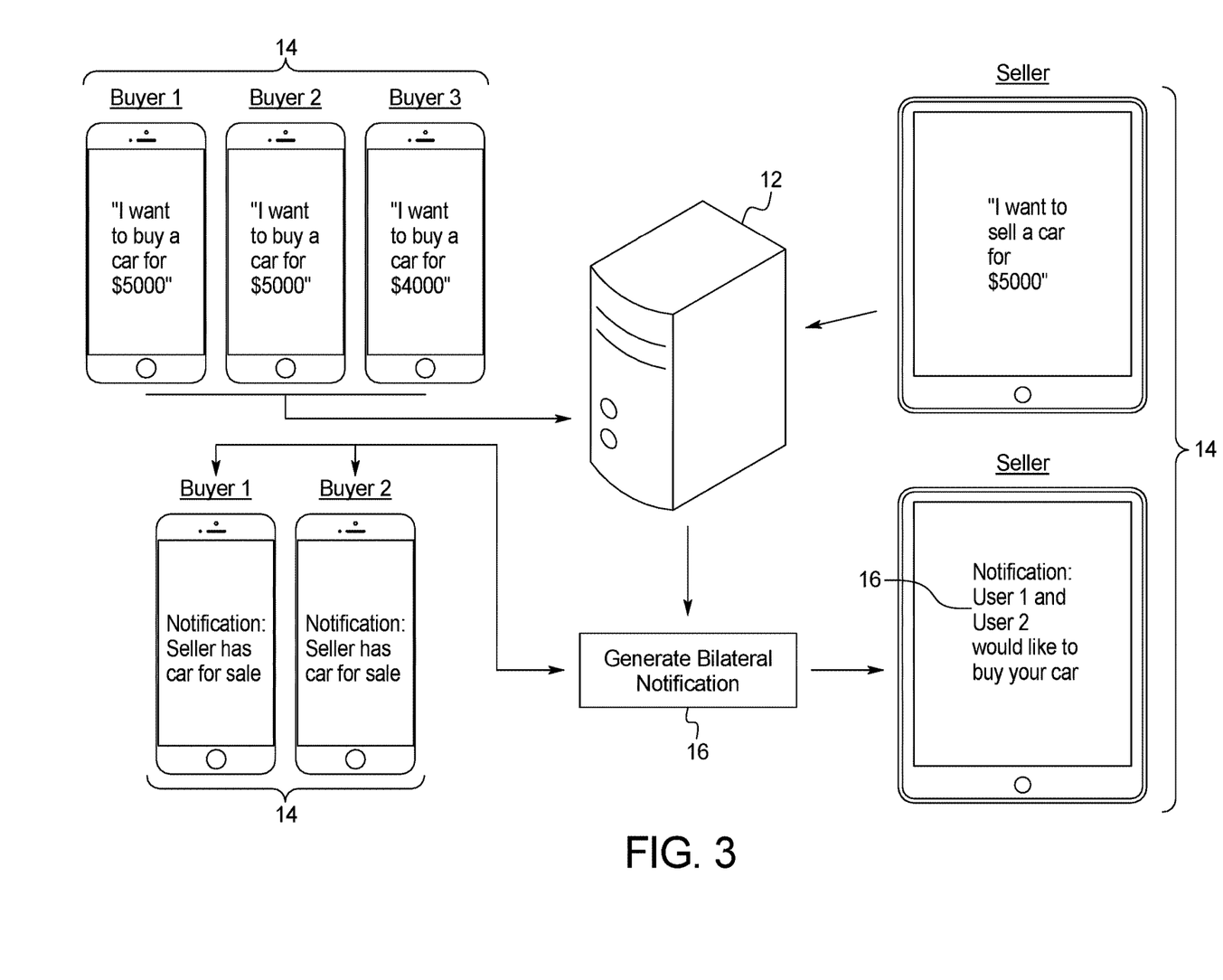
FIG. 3 is an overview diagram of a bilateral social media notification system generating a user-to-group bilateral notification.

FIG. 3 is an overview diagram of a bilateral social media notification system 10 generating a user-to-group bilateral notification. As shown in FIG. 3, the present system 10 may be configured to send notifications to a group of end users (e.g., more than one) if all of the users indicate within the system that they wish for such a notification to be sent. Similar to the embodiment shown in FIG. 1, the present example features end user devices 14 and a centralized server 12. In this example, several end users have indicated they wish to purchase a car. Two of the end users wish to buy a car for $5000.00 (Buyer 1 and Buyer 2) while one user wishes to buy a car for $4000.00 (Buyer 3). Another user wishes to sell their car for $5000.00 (Seller 1). If all users indicate this information within the bilateral social media notification system, the system will generate a notification for the matching users only. This enables the selling user (Seller 1) to efficiently connect with serious buyers who have similar expectations in terms of price. The users may also indicate they wish for the item for sale to be within a certain zip code or distance from them as well as other details about the good or service for sale. This use of the system also prevents the user "Seller 1" from having to post their item on social media with a price, preserving a valuable negotiation tool.

It should be noted that they system 10 may also be programmed to enable a list of matching buyers to be purchased instead of freely given out. This could prove to be quite valuable to Selling users and has implementations beyond the sale of goods and services. For instance, the system 10 could be set up to enable end users to pay to see what employers are interested in them, who wishes to date them, etc.

Figure 4:
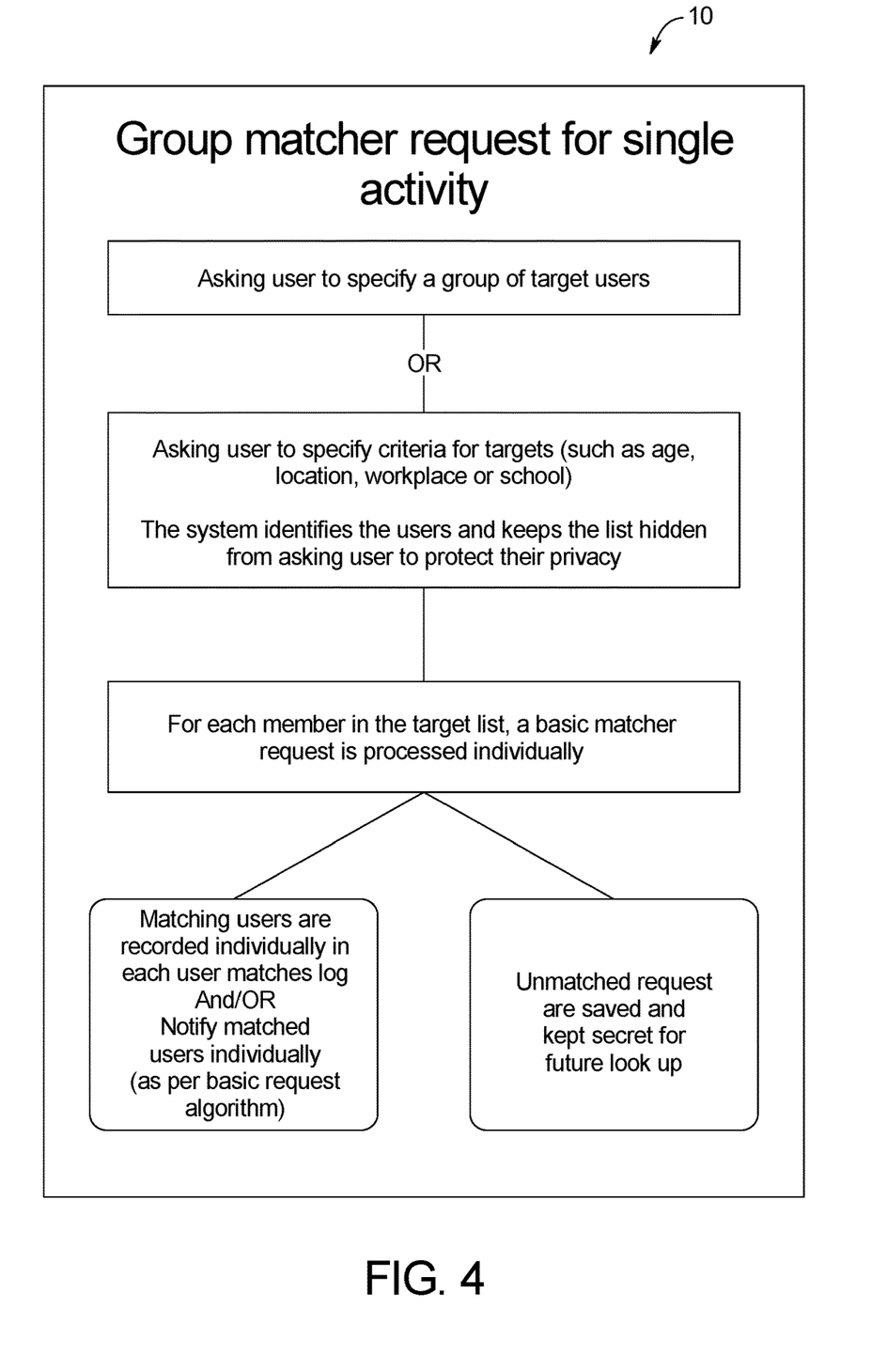
FIG. 4 is a flowchart of a bilateral social media notification system for a user-to-group request.
Figure 5:
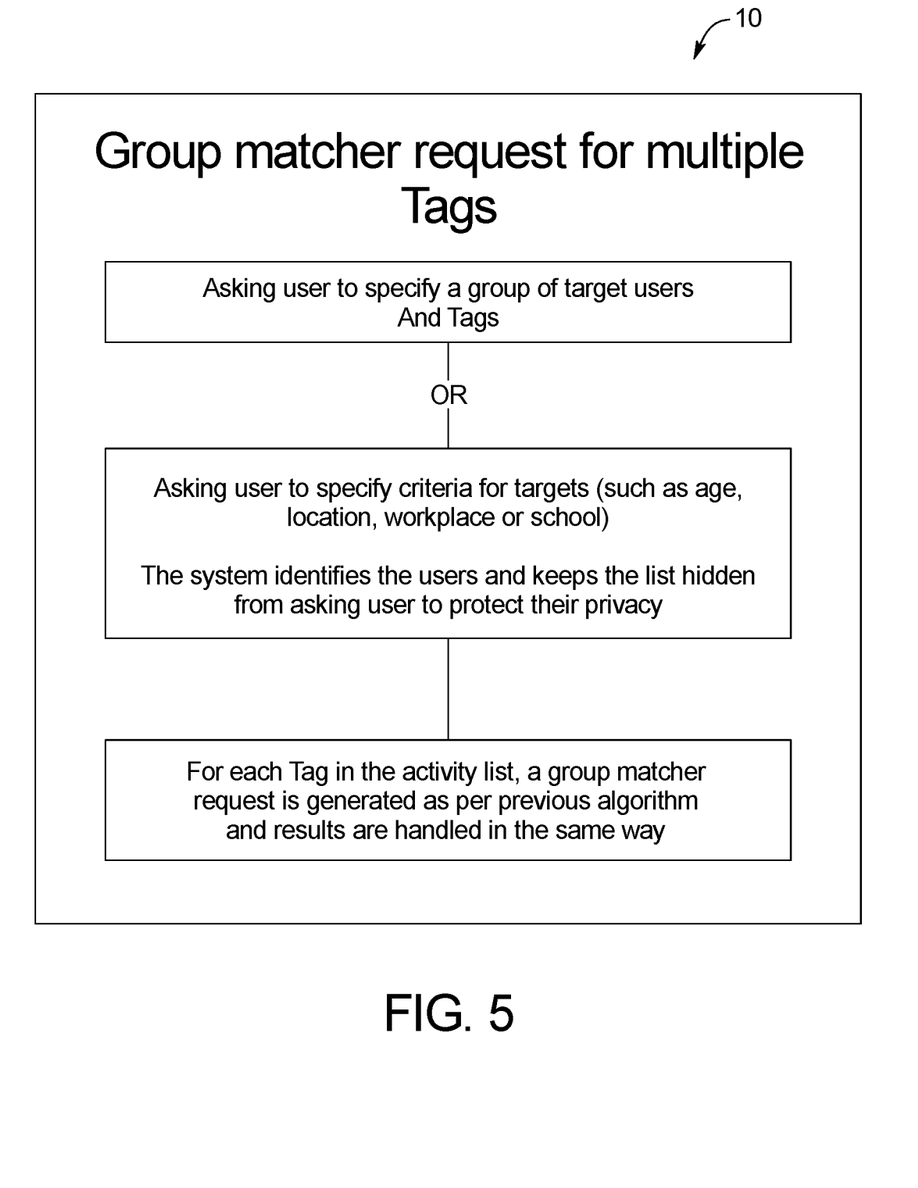
FIG. 5 is a flowchart illustrating that multiple tags may be used in a user-to-group request.
Figure 7:
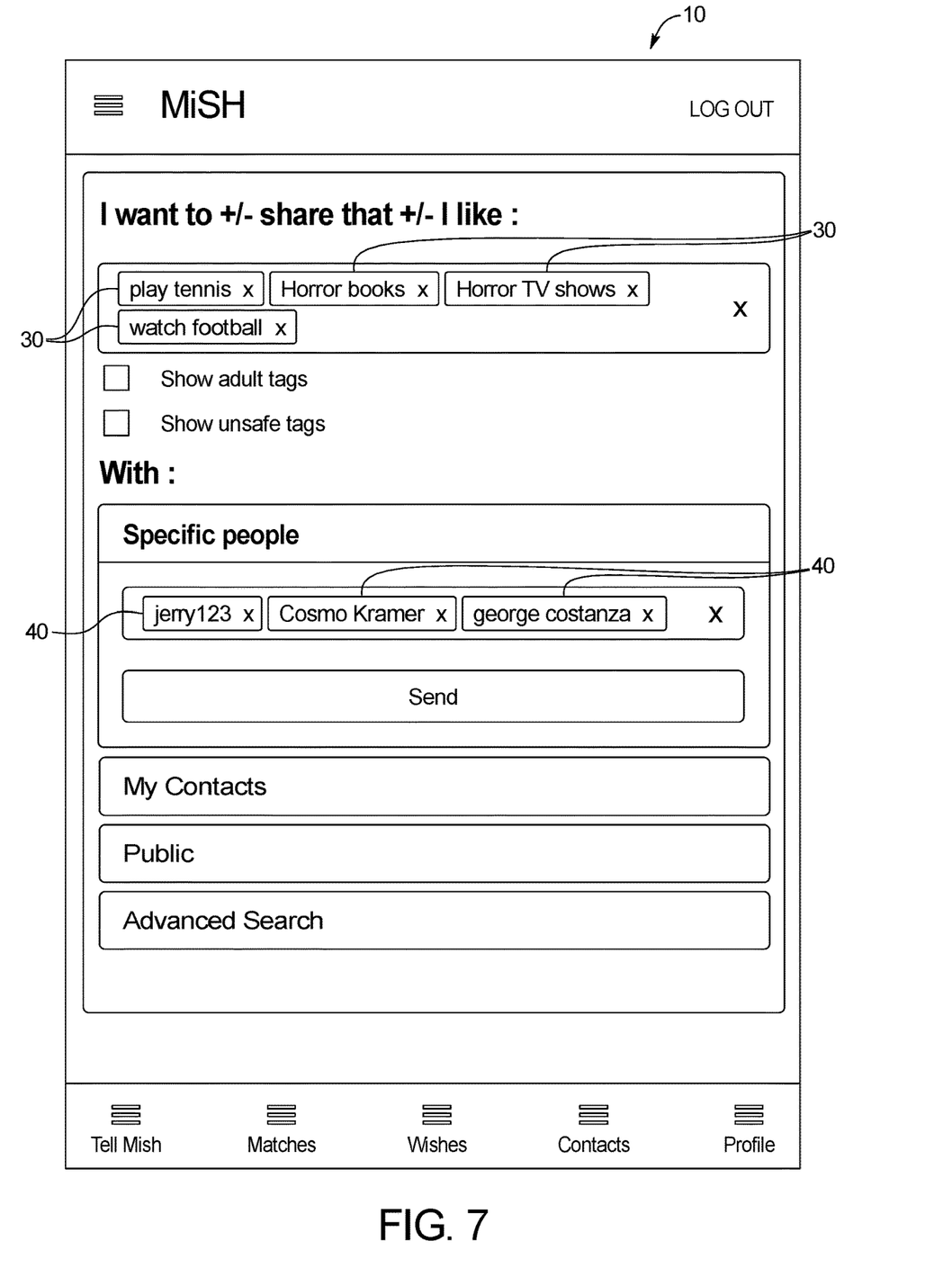
FIG. 7 is a schematic of a user interface of the present system wherein a user can specify certain activity tags and/or specific people to share the activity tag.
Figure 8:
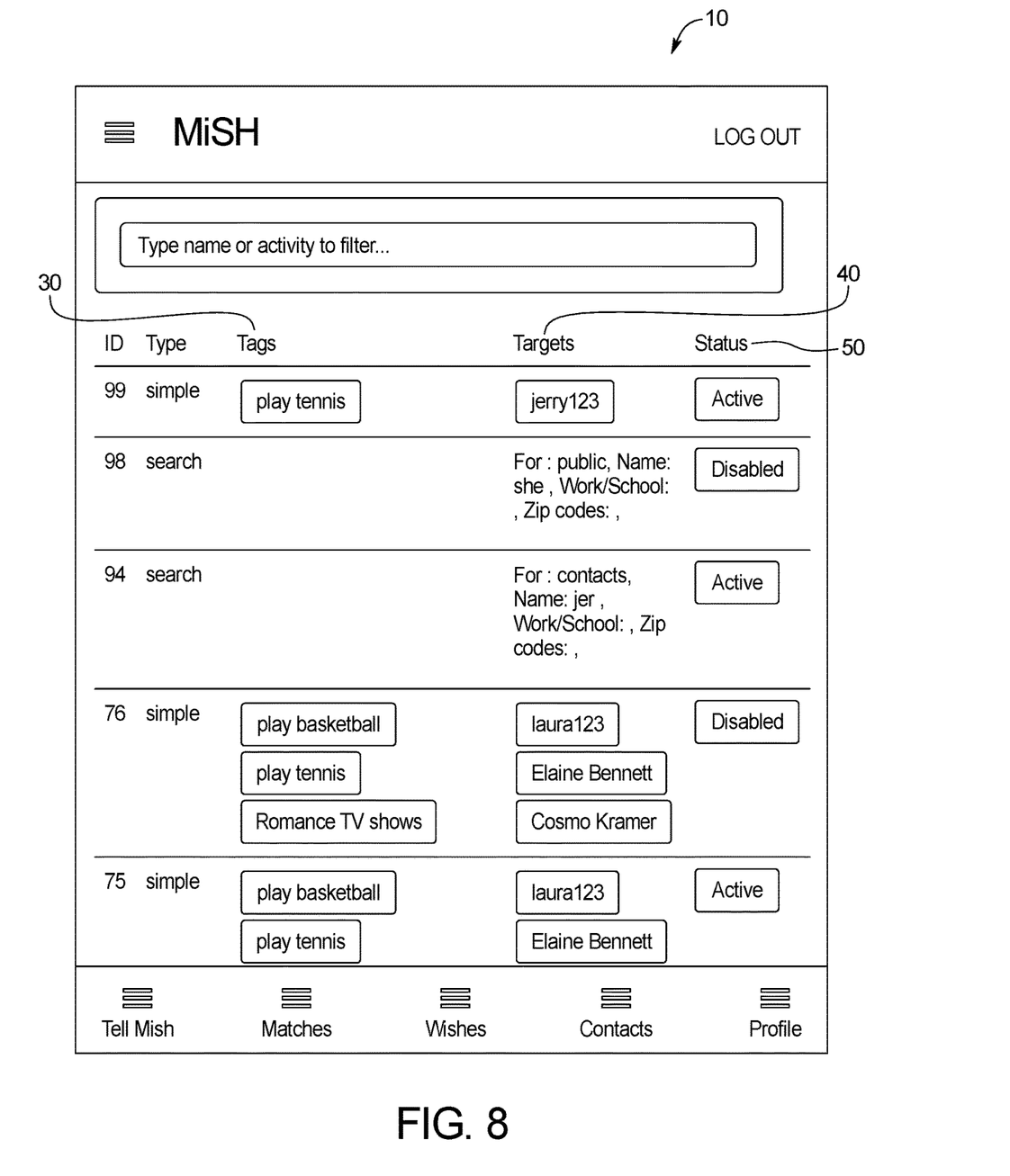
FIG. 8 is a schematic of a user interface of the present system including the tags, possible targets, and the status of the parties.

FIG. 4 is a flowchart of a bilateral social media notification system 10 for a user-to-group request. As shown in FIG. 4, users may target a group of users who have similar attributes instead of a specific user. Who the members of this group are or if there are any users which match the criteria of the targeted "group" may be kept from the requesting user to protect privacy initially. Once the party inputs a request to, for example "Play catch in Central Park" the system will then survey other system users for matching users. The system may return a list of matching user(s) who also have indicated they wish to "Play catch in Central Park" and the notification(s) generated off such a match may be automatic or sent at the discretion of the matching end users. For example, as shown in FIGS. 7-8, the user can identify various activity tags 30 that the system can use to automatically match with other users. Alternatively, or in addition to, the user can specify specific recipients 40 or groups of recipients for the system to send the request or only send the request if the identified recipients have also identified the same activity tag in an active status 50. FIG. 5 further refines the user-to-group request flowchart example to illustrate that multiple tags may be used in a user-to-group request. For example, an end user may want to "Play catch in Central Park" and then "Get Ice Cream". They system may then identify other users who are interested in both activities and notify those users.

Figure 6:
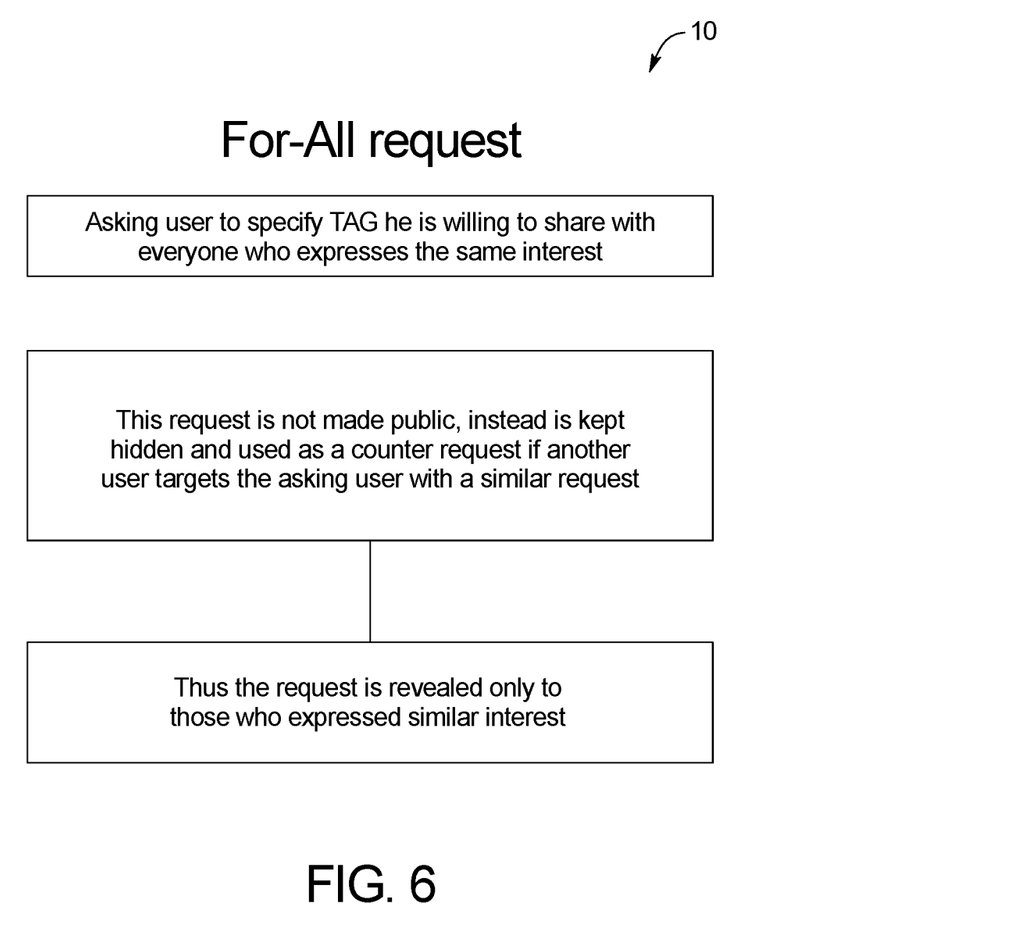
FIG. 6 is a flowchart of a bilateral social media notification system for a user-to-all request.

FIG. 6 is a flowchart of a bilateral social media notification system 10 for a user-to-all request. As shown in FIG. 6, if a user wishes to notify any other user with a given matching activity tag, they may indicate as such and the system will match them with all other users with the same activity tag. No other criteria are considered with this option and enables users to cast a wide net while still avoiding rejection. An example of such a request could be a user indicating within the system they simply wish to "Play Catch" with no other limits put on the request. All other system user who wish to "Play Catch" as well would be notified and the user(s) could sort themselves outside of the system.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A mobile social activity networking system comprising:
a controller;
a memory coupled to the controller, wherein the memory is configured to store program instructions executable by the controller;
wherein in response to executing the program instructions, the controller is configured to:
receive input of a first user invitation on a first user computing device via a downloaded social networking application on the user computing device, wherein the first user invitation includes at least one identified recipient;
store the first user invitation in a database associated with the controller; and
upon receiving a second invitation from the identified recipient on a second user computing device via the downloaded social networking application, wherein the second invitation includes the identification of the first user, communicate the first user invitation to the identified recipient via the second user computing device, and communicate the second invitation to the first user via the first user computing device,
wherein the first user invitation is not disclosed to the identified recipient if the second invitation does not include the identification of the first user,
wherein the second invitation is not disclosed to the first user if the first user invitation does not include the identified recipient associated with the second user computing device,
wherein the first user invitation includes a first request to contact the identified recipient via the social networking application, wherein the second invitation includes a second request to contact the first user via the social networking application, wherein the first user invitation includes a request to follow a social media account of the identified recipient, wherein the second invitation includes a request to follow a social media account of the first user, wherein the first user invitation is not disclosed to the second user if the second invitation is not received by the first user.

2. The system of claim 1, wherein if the second invitation is not received by the first user within a predetermined time frame, the controller is configured to delete the first user invitation.

3. The system of claim 1, wherein the first user invitation includes a first subject matter, wherein the second invitation includes a second subject matter, wherein if the first subject matter matches the second subject matter, the controller is configured to communicate the first user invitation to the identified recipient via the second user computing device, and communicate the second invitation to the first user via the first user computing device.

4. The system of claim 1, wherein the first user invitation includes a change in a relationship status with the identified recipient in a social media account.

5. The system of claim 1, wherein the first user invitation includes a request for a social activity with the identified recipient, wherein the request includes a date and location.

6. The system of claim 1, wherein the at least one identified recipient is a username.

7. The system of claim 1, wherein the at least one identified recipient is an identified group of users associated with at least one user preference.

8. The system of claim 1, wherein the at least one identified recipient is an identified group of users associated with at least one an activity tag.

9. The system of claim 1, wherein the first user invitation includes an offer for sale of an item, wherein the second user invitation includes an offer for purchase of the item.

10. The system of claim 9, wherein the offer for purchase of the item includes an offer price, wherein when the offer price is greater than a predetermined sale price threshold associated with the offer for sale, the controller is configured to communicate the offer for purchase to the first user.

11. The system of claim 1, wherein the first user invitation includes an offer for purchase of an item, wherein the second user invitation includes an offer for sale of the item.

12. The system of claim 11, wherein the offer for purchase of the item includes an offer price, wherein when the offer price is greater than a predetermined sale price threshold associated with the offer for sale, the controller is configured to communicate the offer for purchase to the first user.

13. The system of claim 1, wherein the first user invitation includes a request to add the first user to a social network associated with the identified recipient, wherein the second invitation includes a request to add the identified recipient to a social network associated with the first user.

14. The system of claim 1, wherein the first user invitation includes a change in a relationship status with the identified recipient in a social media account.

15. The system of claim 1, wherein the first user invitation includes a request for a social activity with the identified recipient, wherein the request includes a date and location.

16. A mobile social activity networking system comprising:
a controller;
a memory coupled to the controller, wherein the memory is configured to store program instructions executable by the controller;
wherein in response to executing the program instructions, the controller is configured to:
receive input of a first user invitation on a first user computing device via a downloaded social networking application on the user computing device, wherein the first user invitation includes at least one identified recipient, wherein the first user invitation includes a subject matter;
store the first user invitation in a database associated with the controller;
form a first group of identified recipients, wherein each member of the first group is associated with user preferences related to the subject matter of the first user invitation;
form a second group, wherein the second group is a subset of the first group, wherein the members of the second group are associated with an active request associated with the first user invitation, wherein the members of the second group are associated with a geographical location within a predetermined distance from a first user location; and
communicate the first user invitation to the members of the second group via at least one second user computing device associated with the member, and communicate the active request of the members of the second group to the first user via the first user computing device,
wherein the first user invitation is not disclosed to the members of the second group if the active request is not associated with the subject matter of the first invitation,
wherein the members of the second group are not disclosed to the first user if the if the members of the second group are not associated with an active request associated with the subject matter of the first invitation,
wherein the first user invitation includes a request to add the first user to a social network associated with the identified recipient.

17. The system of claim 16, wherein only the members of the second group are disclosed to the first user via the first user computing device.

18. The system of claim 17, wherein if the active request is not received by at least one of the members of the second group within a predetermined time frame, the controller is configured to delete the first user invitation.

* * * * *